United States Patent [19]

Ikeda

[11] Patent Number: 5,003,529
[45] Date of Patent: Mar. 26, 1991

[54] INFORMATION RECORDING AND REPRODUCING DEVICE HAVING BIAS SELECTING MEANS

[75] Inventor: Hidetoshi Ikeda, Yokohama, Japan

[73] Assignee: Kabushiki Kaisha Toshiba, Kawasaki, Japan

[21] Appl. No.: 418,967

[22] Filed: Oct. 10, 1989

Related U.S. Application Data

[63] Continuation of Ser. No. 346,348, Apr. 28, 1989, abandoned, which is a continuation of Ser. No. 133,272, Dec. 15, 1987, abandoned.

[30] Foreign Application Priority Data

Dec. 20, 1986 [JP] Japan ............................ 61-304679

[51] Int. Cl.$^5$ .................... G11B 7/00; G11B 7/125
[52] U.S. Cl. ............................ 369/116; 346/76 L
[58] Field of Search ................. 369/61, 116, 121; 346/76 L, 108, 135.1

[56] References Cited

U.S. PATENT DOCUMENTS

| | | | |
|---|---|---|---|
| 4,142,210 | 2/1979 | Otobe et al. .................. 369/61 |
| 4,157,568 | 6/1979 | Ohki et al. ................... 369/116 X |
| 4,328,506 | 5/1982 | Yoshida et al. ............... 369/116 X |
| 4,542,388 | 9/1985 | Harada ........................ 369/116 X |
| 4,750,161 | 6/1988 | Takeuchi et al. ............. 369/116 X |
| 4,813,034 | 3/1989 | Mashimo ...................... 369/54 X |

FOREIGN PATENT DOCUMENTS

| | | | |
|---|---|---|---|
| 60-83234 | 5/1983 | Japan ......................... 369/116 |
| 59-231747 | 12/1984 | Japan ......................... 369/116 |
| 61-117735 | 6/1986 | Japan ......................... 369/116 |

*Primary Examiner*—Robert L. Richardson
*Attorney, Agent, or Firm*—Finnegan, Henderson, Farabow, Garrett, and Dunner

[57] ABSTRACT

An information recording and reproducing device wherein bias power applied to a semiconductor laser is made larger by means of a switch circuit as the position of recording comes nearer to the outer circumference of an optical disc, and wherein the base potential of a transistor which is rendered operative in response to a recording signal is changed to keep the peak value of said recording signal unchanged even when the bias power is changed by the switch circuit, so that when not the peak power but the bias power supplied to the semiconductor laser is changed at every recording position on the optical disc in the radial direction thereof, the semiconductor laser can be prevented from becoming fatigued and the state of recording can be kept uniform at every recording position on the optical disc.

15 Claims, 4 Drawing Sheets

INFORMATION RECORDING AND REPRODUCING DEVICE HAVING BIAS SELECTING MEANS

This application is a continuation of application Ser. No. 346,348, filed Apr. 28, 1989 and now abandoned, which is a continuation of application Ser. No. 133,272, filed Dec. 15, 1987, now abandoned.

BACKGROUND OF THE INVENTION

The present invention relates to an information recording and reproducing device for use with an optical disc.

As is well known, various types of information recording and reproducing devices have been proposed for recording information onto and reading recorded information out of an optical disc by means of a laser beam emitted from a semiconductor laser means.

These information recording and reproducing devices can be grouped into two types: one type does not change the recording current of the semiconductor laser means, while the other type increases the peak light amount of recording signal as its laser comes closer to the outer circumference of the optical disc, the laser recording information on the optical disc, in the radial direction thereof, commencing at the inner circumference.

The first-mentioned type wherein the recording current is left unchanged at the inner and outer circumferential portions of the optical disc has the disadvantages that information cannot be sufficiently recorded on the optical disc at the outer circumferential portion thereof and that recording becomes more and more difficult because the output of the semiconductor laser means changes with time.

The second-mentioned type wherein the peak light amount of recording signal is increased more and more as its laser comes nearer the outer circumference of the optical disc has also the disadvantage that the load imposed on the semiconductor laser means is too much results in excessive use of the laser means.

SUMMARY OF THE INVENTION

The object of the present invention is to provide an information recording and reproducing device capable of keeping information recording uniform on all area of a recording medium in the radial direction thereof and preventing the semiconductor laser means from becoming fatigued.

This object of the present invention can be achieved by a device for recording information by light irradiated on a recording medium and reproducing the thus-recorded information, said device comprising a light source controlled responsive to recording signal which represents information to be recorded, a bias setting means for setting bias power, which is applied to the recording medium, according to the recording position on the recording medium when information is being recorded, and a control means for controlling certain the maximum value of the recording signal supplied to the light source responsive to the set bias power.

According to the present invention, when information is being recorded, a bias is added to the light source, not the peak power of the light source but the bias power is changed according to the recording position on the recording medium in the radial direction thereof, thereby preventing the light source from becoming fatigued and keeping the information recording uniform on all area of the recording medium.

DETAILED DESCRIPTION OF THE PREFERRED EMBODIMENT

An embodiment of the present invention will be described in detail with reference to the accompanying drawings.

Figure 1:
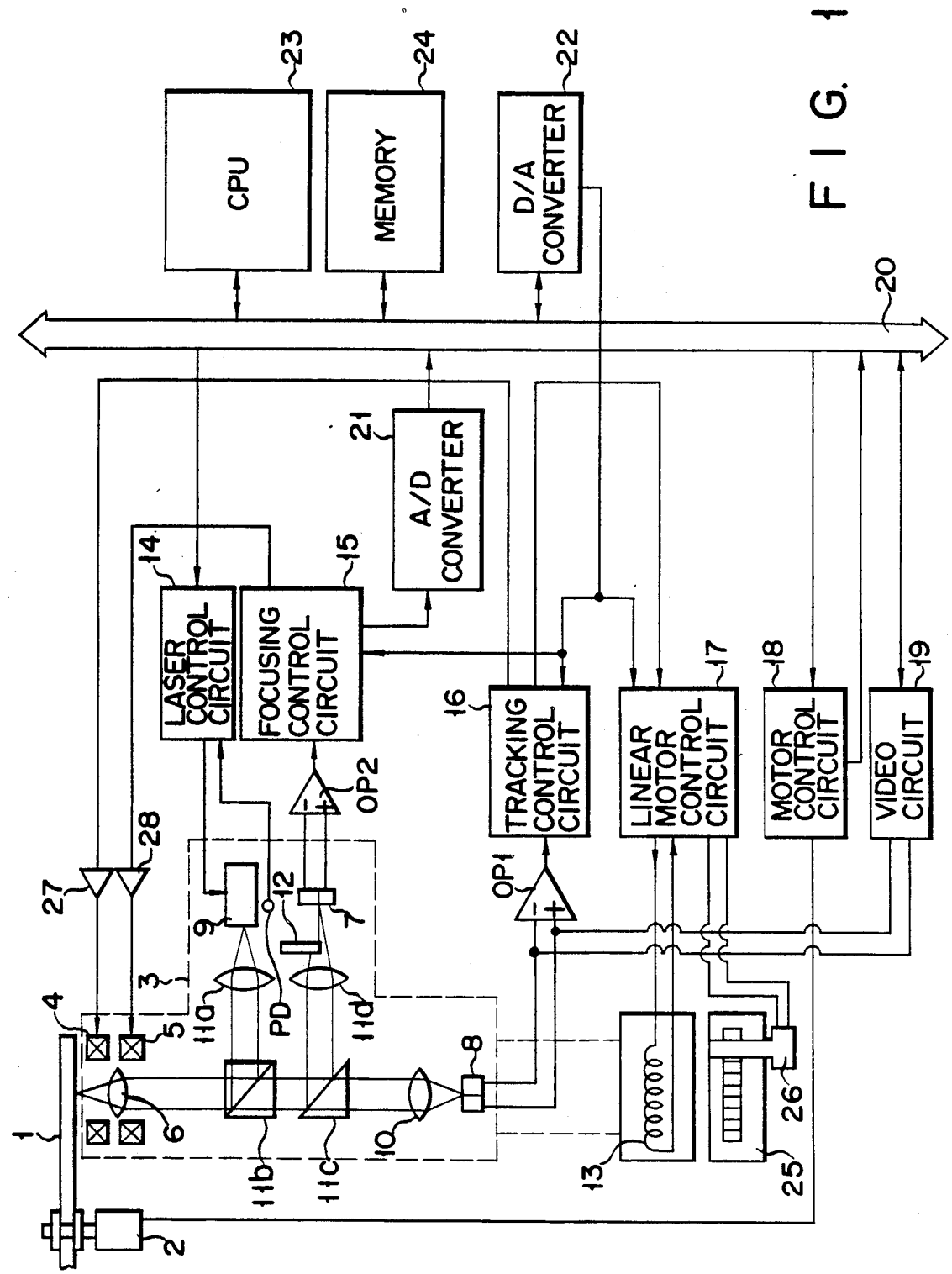
FIG. 1 is a system arrangement view of an information recording and reproducing device according to the present invention.

FIG. 1 shows an information recording and reproducing device. A spiral or concentric tracks are formed on the surface of an optical disc (or recording medium) 1. The optical disc 1 is preferably rotated by a motor 2 at a constant speed. The motor 2 is controlled by a motor control circuit 18. Information recording and reproducing relative to the optical disc 1 is attained by an optical head 3. This optical head 3 is fixed to a driving coil 13 which forms the moving element of a linear motor. The driving coil 13 is connected to a linear motor control circuit 17, to which a detector 26 for detecting the position of the linear motor is connected. The detector 26 detects an optical scale 25 arranged at the optical head 3 to output a position signal. A permanent magnet (not shown) is arranged at the fixed portion of the linear motor and when the driving coil 13 is excited by the linear motor control circuit 17, the optical head 3 is moved in the radial direction of the optical disc 1.

An objective 6 is held by a plate spring (not shown) to face the optical head 3. The objective 6 can be moved in its focusing direction (or along its optical axis) by means of a driving coil 5, while it can also be moved in its tracking direction (or in a direction perpendicular to its optical axis) by means of a driving coil 4. Laser light created by a semiconductor laser 9 which is driven by a laser control circuit 14 is irradiated on the optical disc 1 through a collimator lens 11a, a half prism 11b and the objective 6. Light reflected by the optical disc 1 is introduced to a half prism 11c through the objective 6 and the half prism 11b and it is divided by the half prism 11c. One of these lights divided by the half prism 11c is introduced to a pair of tracking position sensors 8 through a focusing lens 10, while the other eight is introduced to a pair of focusing position detectors 7 through a focusing lens 11d and a knife edge 12.

Signals output through the tracking position sensors 8 are supplied to a tracking control circuit 16 through a differential amplifier $OP_1$. A track difference (or differential) signal output through the tracking control circuit 16 is supplied to the linear motor control circuit 17 and also to the driving coil 4, which serves to move the objective 6 in the tracking direction, through an amplifier 27.

Signals relating to the focusing points of the laser light are output through the focusing position sensors 7 and supplied to a focusing control circuit 15 through a differential amplifier OP$_2$. A signal output through the focusing control circuit 15 is supplied to the driving coil 5, which serves to drive the objective 6 in the focusing direction, through an amplifier 28. The driving coil 5 is controlled by the signal supplied from the control circuit 15 to cause the laser light to always be correctly focused on the optical disc 1.

When the focusing and tracking process has been finished as described above, a sum signal of the outputs applied through the tracking position sensors 8 represents bits (or recording information) formed as concaves and convexes on the track. This sum signal is supplied to a video circuit 19 where it is reproduced as image information.

The laser control circuit 14, focusing control circuit 15, tracking control circuit 16, linear motor control circuit 17, motor control circuit 18, video circuit 19 and the like are controlled by a CPU 23 through a bus line 20. The CPU 23 carries out certain operations responsive to programs stored in a memory 24. Numerals 21 and 22 represent A/D and D/A converters used to transmit and receive information between the focusing control circuit 15, tracking control circuit 16 and linear motor control circuit 17 and the CPU 23.

Figure 2:
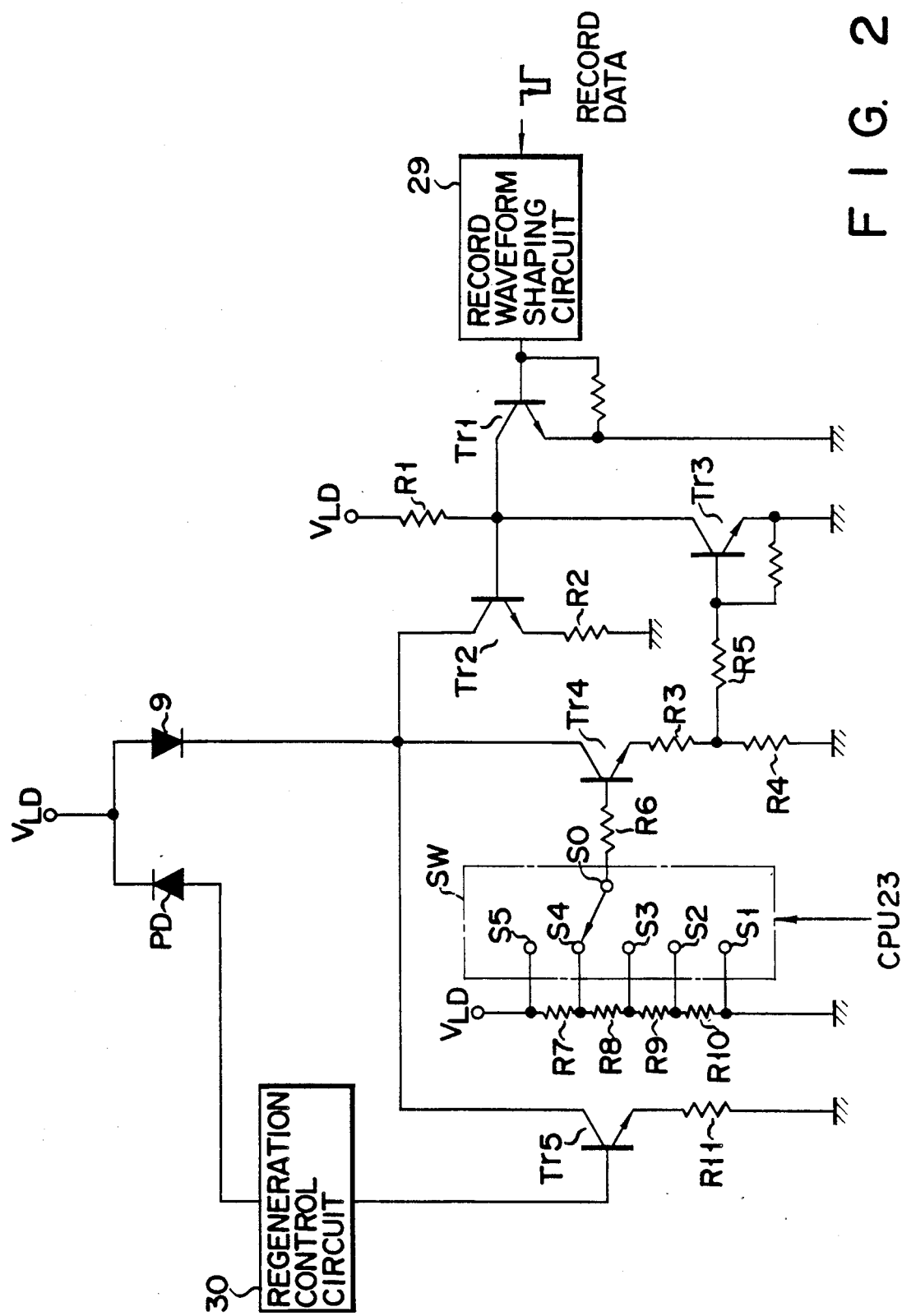
FIG. 2 is a circuit arrangement view showing a laser control circuit of the information recording and reproducing device shown in FIG. 1.

FIG. 2 shows the laser control circuit 14 shown in FIG. 1. The output terminal of a record waveform shaping circuit 29 is connected to the base of a transistor Tr$_1$. The emitter of the transistor Tr$_1$ is grounded and its collector is connected to a power source V$_{LD}$ through a resistor R$_1$ while connected to the collector of a transistor Tr$_3$ as well as to the base of a transistor Tr$_2$. The emitter of the transistor Tr$_2$ is grounded through a resistor R$_2$ and its collector is connected to the collectors of transistors Tr$_4$ and Tr$_5$ while connected to the cathode of the semiconductor laser 9. The anode of this semiconductor laser 9 is connected to another power source V$_{LD}$. The emitter of the transistor Tr$_4$ is grounded through a series circuit of resistors R$_3$ and R$_4$. The junction point between the resistors R$_3$ and R$_4$ is connected to the base of the transistor Tr$_3$ through a resistor R$_5$, whose emitter is grounded. The base of the transistor Tr$_4$ is connected to a movable contact S$_0$ in a switch circuit SW, which is controlled by the CPU 23, for example, through a resistor R$_6$. A contact S$_5$ of fixed ones S$_1$–S$_5$ which form the switch circuit SW is connected to the power source V$_{LD}$ and the contact S$_1$ is grounded. The contacts S$_2$–S$_4$ are connected to their respective junction points between resistors R$_7$–R$_{10}$ which are connected between a power source V$_{LD}$ and the ground.

A light receiving element PD for detecting the amount of light irradiated by the semiconductor laser 9 is arranged adjacent to the semiconductor laser 9. The cathode of the light receiving element PD is connected to the power source V$_{LD}$ and its anode to the base of the transistor Tr$_5$ through a regeneration control circuit 30. The emitter of this transistor Tr$_5$ is grounded through a resistor R$_{11}$.

When the information which has been recorded on the optical disc 1 is to be reproduced, using the above-described arrangement, the movable contact piece S$_0$ is connected to the fixed contact S$_1$ in the switch circuit SW which is controlled by the CPU 23. The transistors Tr$_4$ and Tr$_3$ are thus turned off while the transistor Tr$_1$ is on. Since the transistor Tr$_1$ is turned on when the information which has been recorded on the optical disk is to be reproduced, the transistor Tr$_2$ is turned off. In this state, the transistor Tr$_5$ is made operative by the regeneration control circuit 30 and the semiconductor laser 9 emits light responsive to a reproducing output. The laser light created by the semiconductor laser 9 is irradiated on the optical disc 1 to contribute to the reproduction of the recorded information. It is detected by the light receiving element PD at the same time. Responsive to the output of the light receiving element PD, the regeneration control circuit 30 renders the transistor Tr$_5$ operative to control the amount of light emitted.

When information is to be recorded on the optical disc 1, the CPU 23 ensures that the movable contact piece S$_0$ is connected to any one of the fixed contacts S$_2$–S$_5$ in the switch circuit SW. This changeover of the movable contact piece S$_0$ is carried out in such a way that the bias power is made larger as the optical head 3 comes nearer to the outer circumference of the optical disc 1. When a recording signal RI of the negative logical type is supplied to the transistors Tr$_1$ and Tr$_2$ through the waveform shaping circuit 29, the transistor Tr$_1$ is turned on and transistor Tr$_2$ is turned off. As a result, the semiconductor laser 9 emits light and the recording operation proceeds. The transistor Tr$_3$ changes the base potential of the transistor Tr$_2$, depending upon the bias power, thereby controlling the peak value of recording signal to be left unchanged even when the bias power changes.

Figure 3:
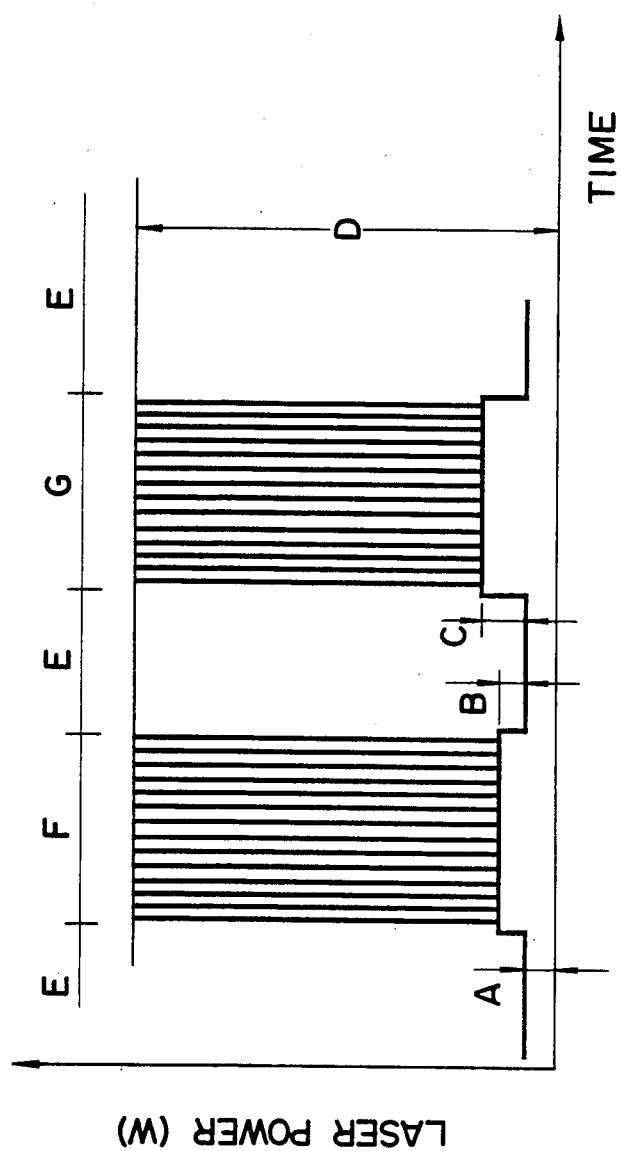
FIG. 3 shows how the laser power of a semiconductor laser means changes with time, said laser means being controlled by the laser control circuit shown in FIGS. 1 and 2.

FIG. 3 shows an example of the light-emitting output of the semiconductor laser 9. In FIG. 3, symbol A represents reproducing current, B bias current at the time when recording is being carried out at the inner circumferential portion of the optical disc 1, C bias current at the time when recording is being carried out at the outer circumferential portion of the optical disc 1, D peak power of recording signal, E time during which reproducing is being carried out or operation is made ready, F time during which recording is being carried out at the inner circumferential portion of the optical disc 1, and G time during which recording is being carried out at the outer circumferential portion of the optical disc 1.

As apparent from FIG. 3, recorded waveforms of the semiconductor laser 9 at the laser control circuit 14 are controlled to keep the peak value of recording signal unchanged even when the bias power at the inner circumferential portion of the optical disc 1 is made different from that at the outer circumferential portion thereof by means of the switch circuit SW.

According to the above-described embodiment of the present invention, not the peak power of recording signal but the bias power supplied to the semiconductor laser is changed at the inner and outer circumferential portions of the optical disc. The recording can be thus kept uniform at the both inner and outer circumferential portions of the optical disc.

Further, only the bias power applied to the semiconductor laser is changed at both times when recording is carried out at the inner and outer circumferential portions of the optical disc, leaving the peak power unchanged. The load imposed on the semiconductor laser can be thus reduced, thereby enabling the semiconductor laser to have a longer life.

Figure 4:
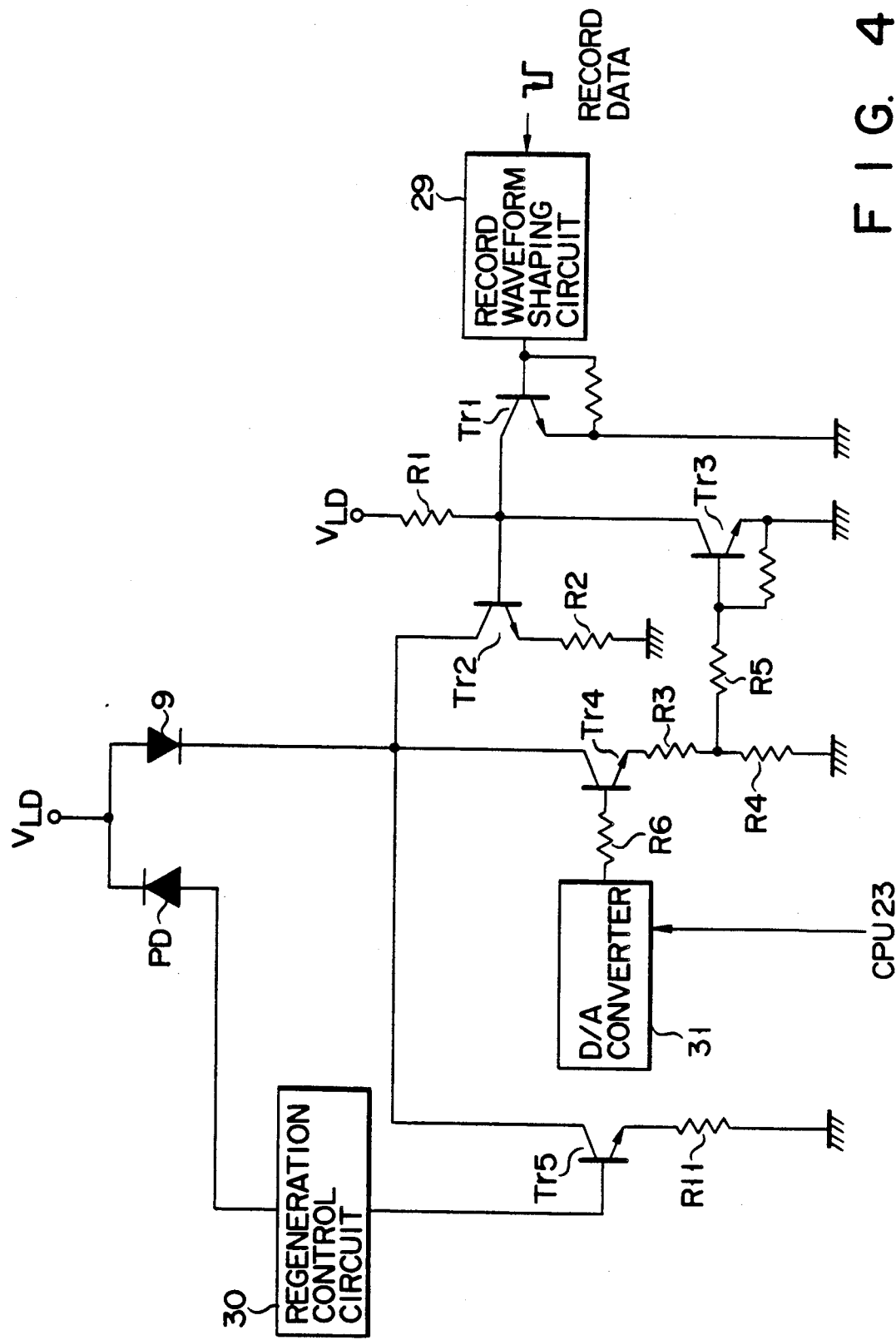
FIG. 4 is a circuit arrangement view showing a modification of the laser control circuit of the information recording and reproducing device.

FIG. 4 is a circuit arrangement view showing a modification of the laser control circuit of the information recording and reproducing device.

Referring to FIG. 4, D/A converter 31, which is controlled by CPU 23, is connected to the base of transistor Tr₄ through resistor R₆. The bias applied to the base of transistor Tr₄ is controlled by D/A converter 31.

It should be understood that the present invention is not limited to the above-described embodiment and that various changes and modifications can be made without departing from the spirit and scope of the present invention.

According to the present invention as described above in detail, there can be provided an information recording and reproducing device capable of keeping its information recording uniform over the entire recording medium in the radial direction thereof, and preventing the semiconductor laser from being fatigued.

What is claimed is:

1. An information recording and reproducing device comprising:
   a recording medium means on which information is recorded;
   a position detector means for detecting the position of information recorded on said recording medium means;
   a bias selecting means for selecting a bias power according to the position on the recording medium means at which information is recorded; and
   control means, responsive to the selected bias power, for maintaining a recording signal at a constant unchanging maximum level regardless of the position on the recording medium means at which information is recorded.

2. An information recording and reproducing device comprising:
   a recording medium means on which information is recorded;
   a signal source means for emitting a light, the intensity of which corresponds to a recording signal which represents the information recorded on the recording medium means;
   a position detector means for detecting the position of information recorded on said recording medium means;
   a bias selecting means for selecting a bias power for the signal source means, according to the position on the recording medium means at which information is recorded; and
   a control means, responsive to the selected bias power, for maintaining the recording signal supplied to the signal source means at a constant unchanging maximum level regardless of the position on the recording medium means at which information is recorded.

3. An information recording and reproducing device comprising:
   a recording medium means on which information is recorded;
   a light source means for emitting a light corresponding to a recording signal which represents the information recorded on the recording medium means;
   a position detector means for detecting the position of information recorded on said recording medium means;
   a bias selecting means for selecting a bias power for the light source means according to the position of recording on the recording medium means at which information is recorded; and
   a control means, responsive to the selected bias power, for maintaining the recording signal supplied to the light source means at a constant unchanging maximum level regardless of the portion on the recording medium means at which information is recorded.

4. An information recording and reproducing device according to claim 3, wherein said light source means is a semiconductor laser.

5. An information recording and reproducing device according to claim 3, wherein said recording medium means is an optical disc.

6. An information recording and reproducing device comprising:
   a recording medium means on which information is recorded;
   a position detector means for detecting the position of information recorded on said recording medium means;
   a control signal generating means for generating a control signal having a level corresponding to the position on the recording medium means at which information is recorded; and
   a control means, responsive to the control signal, for maintaining a recording signal supplied to a signal source at a constant unchanging maximum level regardless of the position on the recording medium means at which information is recorded.

7. An information recording and reproducing device comprising:
   recording medium means on which information is recorded;
   a signal source means for emitting a light corresponding to a recording signal which represents information recorded on the recording medium means;
   a position detector means for detecting the position of information recorded on said recording medium means;
   a control signal generating means for generating a control signal having a level corresponding to the position on the recording medium means at which information is recorded; and
   a control means, responsive to the control signal for maintaining the recording signal supplied to the signal source means at a constant unchanging maximum level regardless of the position on the recording medium means at which information is recorded.

8. An information recording and reproducing device comprising:
   a recording medium means on which information is recorded;
   a signal source means for emitting a light corresponding to a recording signal which represents information recorded on the recording medium means;
   a position detector means for detecting the position of information recorded on said recording medium means;
   a control signal generating means for generating a control signal having a level corresponding to the position on the recording medium means at which information is recorded; and
   a control means comprising a first current variable element in which a current flows which varies according to the level of the control signal, and a second current variable element, cooperating with the first current variable element, in which a current flows so as to maintain the recording signal at a constant unchanging maximum level regardless of the position on the recording medium means at which information is recorded.

9. An information recording and reproducing device comprising:
- a recording medium means on which information is recorded;
- a signal source means for emitting a light corresponding to a recording signal which represents information recorded on the recording medium means;
- a position detector means for detecting the position of information recorded on said recording medium means;
- a control signal generating means for generating a control signal having a level corresponding to the position on the recording medium at which information is recorded; and
- a control means comprising a first transistor in which a current flows which varies according to the level of the control signal, and a second transistor, cooperating with the first transistor, in which a current flows so as to maintain the recording signal at a constant unchanging maximum level regardless of the position on the recording medium means at which information is recorded.

10. An information recording and reproducing device according to claim 2, wherein said signal source means is a semiconductor laser.

11. An information recording and reproducing device according to claim 7, wherein said signal source means is a semiconductor laser.

12. An information recording and reproducing device according to claim 8, wherein said signal source means is a semiconductor laser.

13. An information recording and reproducing device according to claim 9, wherein said signal source means is a semiconductor laser.

14. An information recording and reproducing device according to claim 1, wherein said bias selecting means is a switch circuit connected to said control means.

15. An information recording and reproducing device according to claim 2, wherein said bias selecting means comprises a bias generating circuit connected between a power source and a ground and a bias selecting circuit connected between the bias generating circuit and control means.

* * * * *

UNITED STATES PATENT AND TRADEMARK OFFICE
CERTIFICATE OF CORRECTION

PATENT NO. : 5,003,529

DATED : March 26, 1991

INVENTOR(S) : Hidetoshi Ikeda

It is certified that error appears in the above-identified patent and that said Letters Patent is hereby corrected as shown below:

Claim 7, column 6, line 33, before "recording" insert --a--.

Signed and Sealed this

Twenty-seventh Day of April, 1993

*Attest:*

MICHAEL K. KIRK

*Attesting Officer*    Acting Commissioner of Patents and Trademarks